Patented Dec. 21, 1937

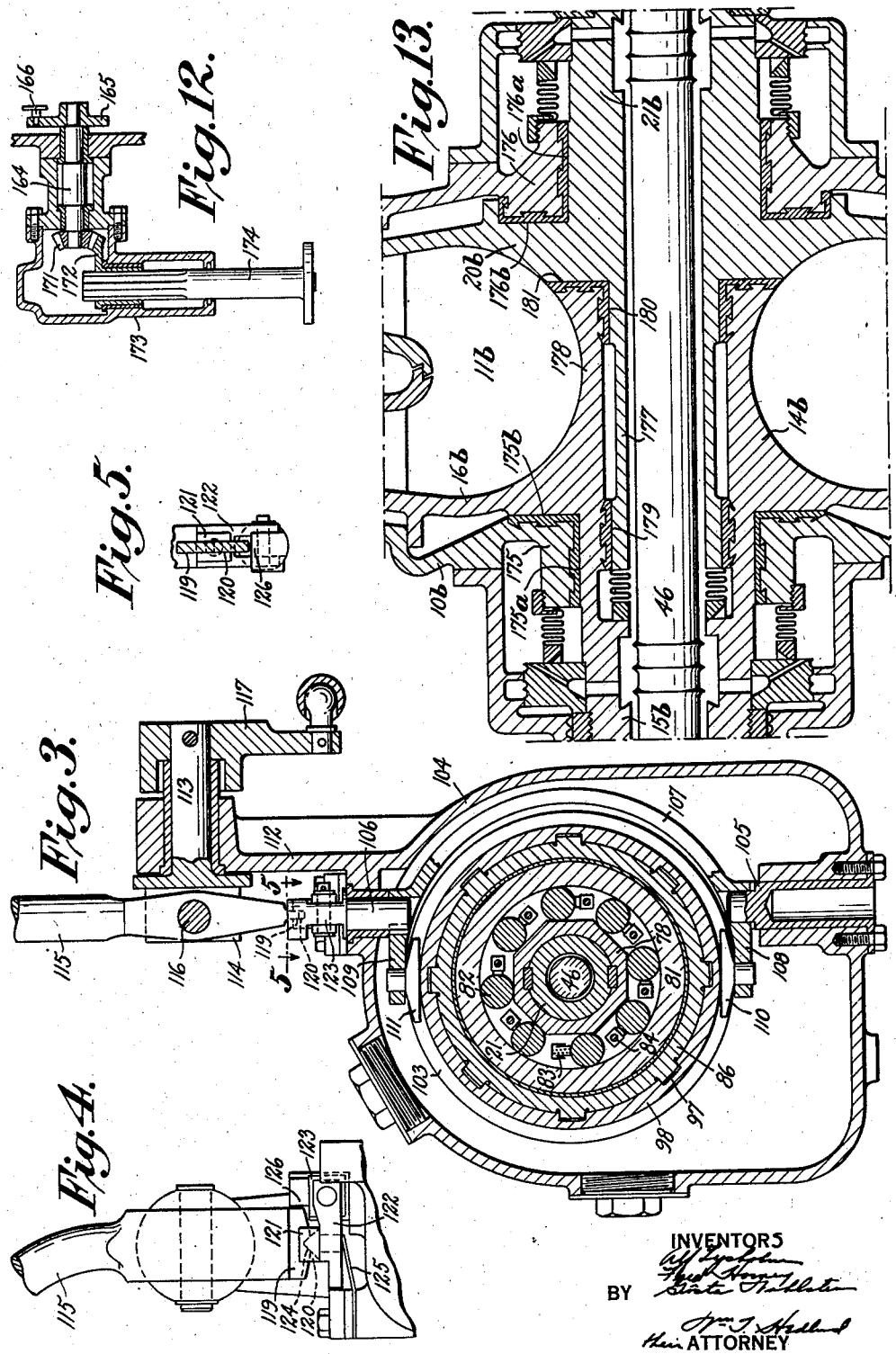

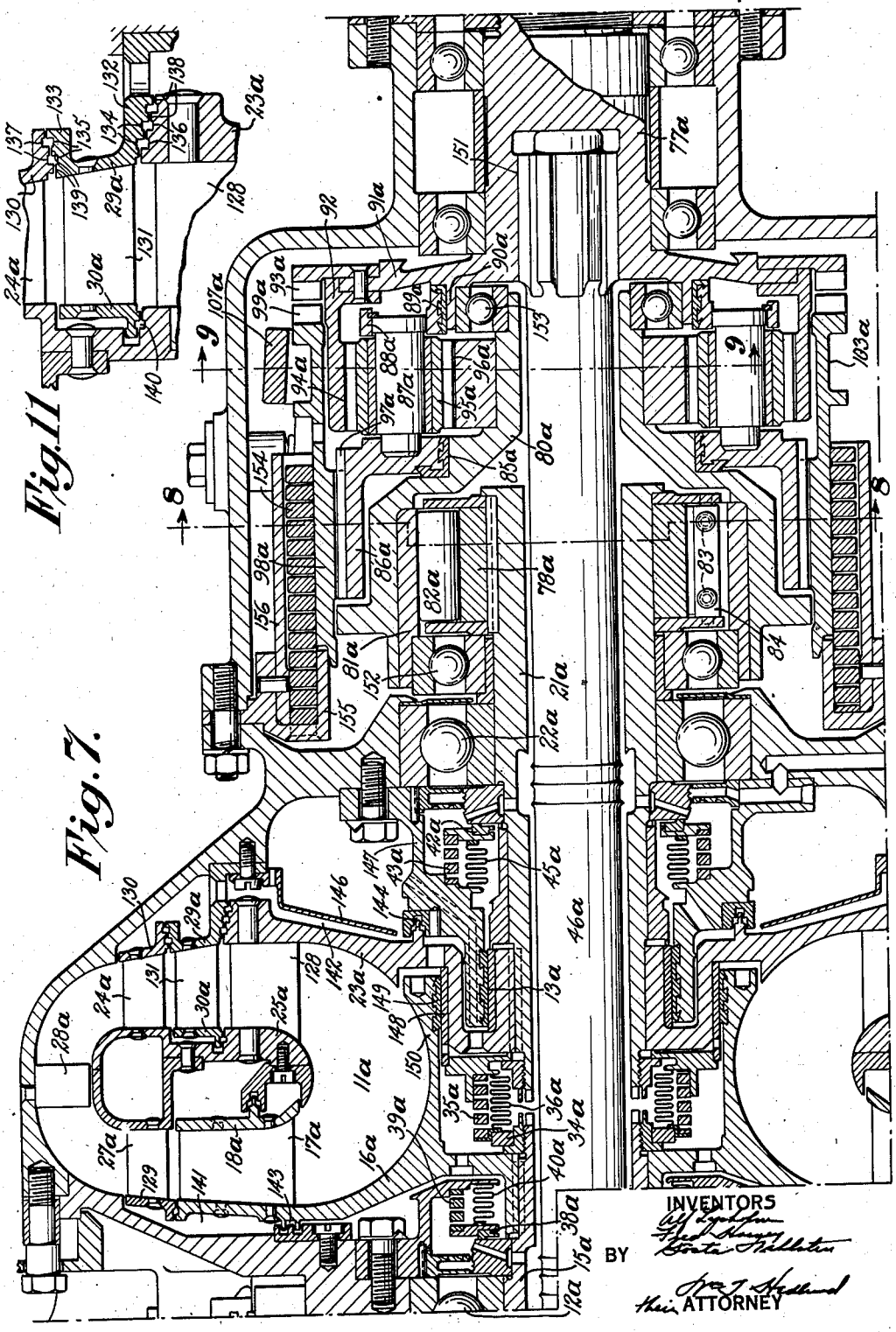

2,102,634

UNITED STATES PATENT OFFICE

2,102,634

VARIABLE SPEED POWER TRANSMISSION

Alf Lysholm, Fred Horney, and Gösta Wahlsten, Stockholm, Sweden, assignors to Aktiebolaget Ljungstroms Ångturbin, Stockholm, Sweden, a corporation of Sweden Application March 3, 1933, Serial No. 659,500. Renewed July 30, 1936. In Germany January 14, 1931

12 Claims. (Cl. 74—293)

This application is a continuation in part with respect to our copending application Serial No. 585,440 filed January 8, 1932 (Pat. No. 1,900,119, granted March 7, 1933) and relates back, so far as herein continued, for all dates and rights incident to the filing of said application Serial No. 585,440 and foreign applications corresponding thereto.

The present invention relates to variable-speed power transmissions and has particular reference to variable-speed power transmissions of the type in which hydraulic variable speed mechanism is combined with mechanical power transmitting mechanism to provide for automatic variable-speed ratios and positive direct drive in forward speeds and a variable-speed reverse.

In its several phases the invention aims to improve upon transmissions of the above stated character, particularly with respect to the following features. In the transmission as a whole it is a principal object of the invention to provide a transmission of maximum compactness both as to axial and transverse dimensions. A further object is to provide in the transmission as a whole an improved arrangement whereby it is possible to obtain a very powerful braking effect from the engine due to the characteristics of the hydraulic part of the mechanism and to make this braking effect available at all times. In the control mechanism, a principal object of the invention is to provide for improved control whereby drive through the transmission may be altered from any of the several conditions of drive to any other, such, for example, as from forward to reverse and vice versa, with the minimum of shock and maximum facility, regardless of the speed of operation of the transmission.

All of the above principal objects and the further and more detailed objects of the invention will more fully appear in the ensuing description of suitable forms of apparatus for carrying the invention into effect.

In the accompanying drawings forming a part of this specification:

Fig. 3 is a section taken on the line 3—3 of Fig. 1 and showing control mechanism omitted from Fig. 1;

Fig. 4 is a side elevation of part of Fig. 3;

Fig. 5 is a section taken on the line 5—5 of Fig. 3 showing a detail of control parts illustrated in Figs. 3 and 4;

Fig. 7 is a view similar to Fig. 1 showing part of another form of transmission;

Fig. 11 is a fragmentary view on enlarged scale of a part of Fig. 7;

Fig. 12 is a section on the line 12—12 of Fig. 8, showing part of the control mechanism; and Fig. 13 is a section similar to Fig. 1, of a part of another form of transmission.

Figure 1:
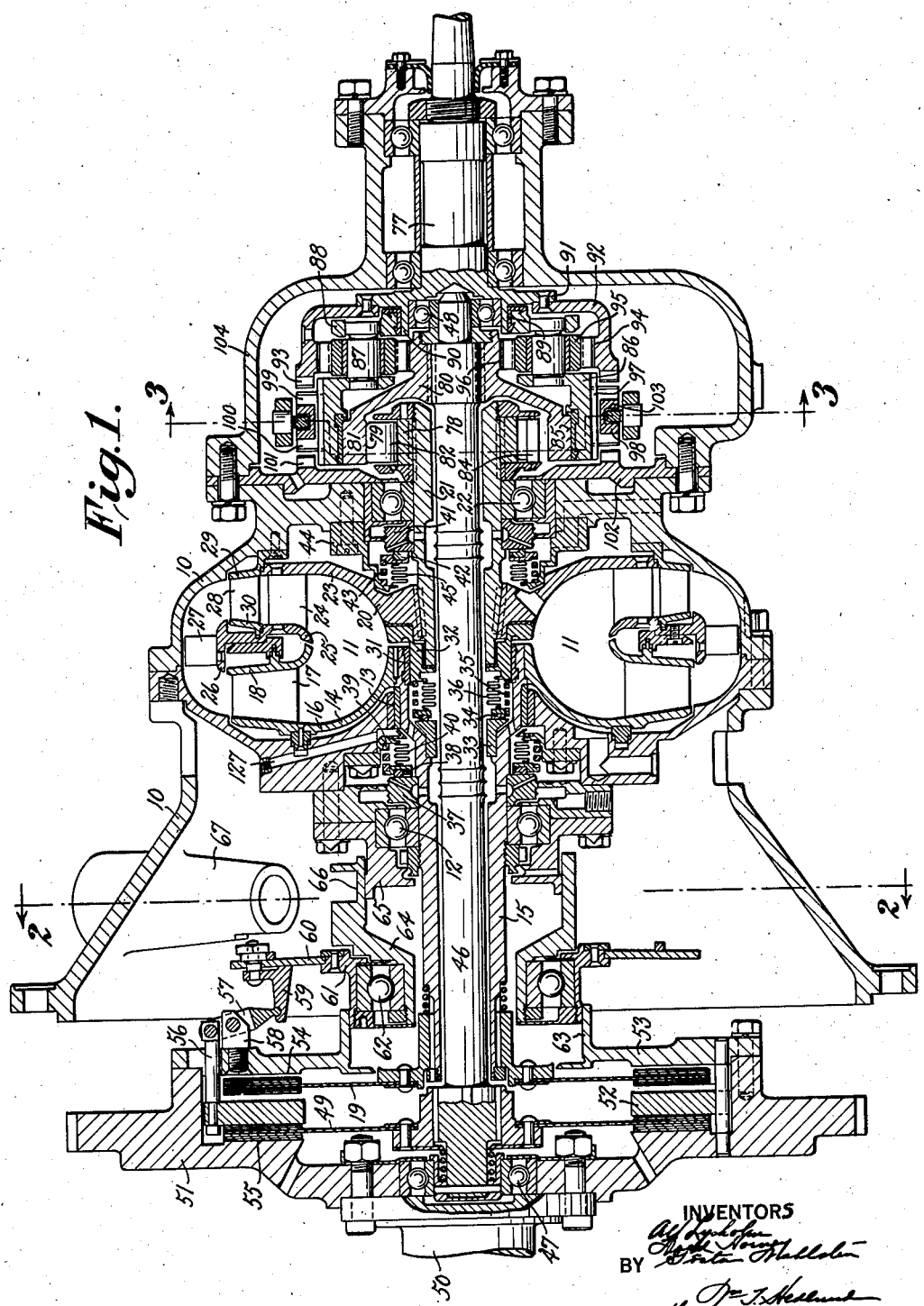
Fig. 1 is a central longitudinal section of a transmission embodying the invention.
Figure 2:
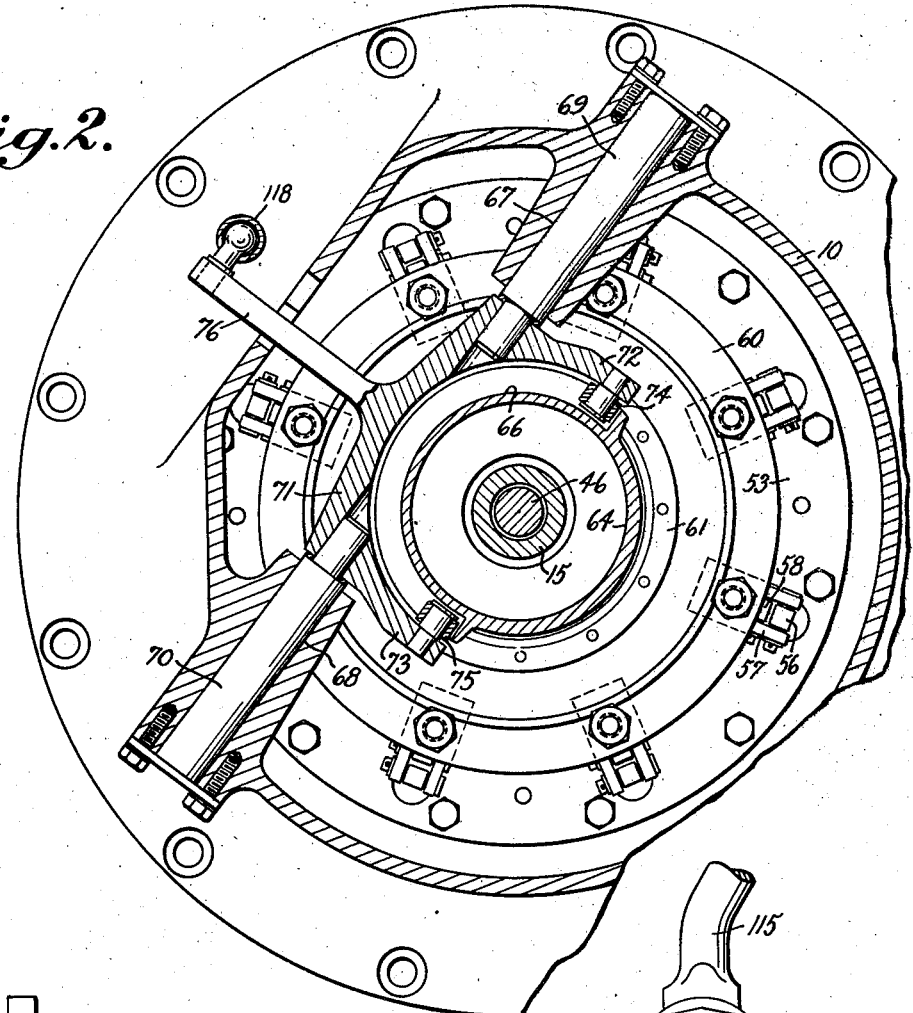
Fig. 2 is a section taken on the line 2—2 of Fig. 1.

Referring now more particularly to Figs. 1 to 6 the form of transmission illustrated therein comprises a casing 10 adapted to be non-rotatably mounted in the frame of a vehicle or the like and providing a main annular chamber 11 for circulation of operating fluid.

Rotatably mounted within casing 10 and axially centrally thereof, as by means of ball bearing 12 and journal bearing 13, is the primary or driving member 14 of the hydraulic power transmitting mechanism. Member 14 comprises a hollow shaft part 15, this part being the part journalled in the bearings, and a disc-like impeller part 16 located within chamber 11 and carrying a ring of impeller or pump blades 17, the axially inner ends of which are joined by an annular ring 18. At its forward end the shaft part 15 of the primary member has splined thereto a clutch plate 19.

The secondary or driven member 20 of the hydraulic power transmitting mechanism comprises a hollow shaft part 21 rotatably mounted in coaxial alignment with the shaft part 15 and supported in housing 10 by ball bearing 22. Member 20 also comprises an impelled or turbine part 23 situated in chamber 11 and comprising a disc-like portion carrying a ring of turbine blades 24 which at their inner ends are joined by and support an annular ring 25. Ring 25 extends radially outwardly from the portion attached to blades 24 and at its outer part has an axially extending circular flange 26 which supports a ring of radially extending turbine blades 27, the outer ends of which extend to within a short distance of the casing 10. Between the rings of turbine blades 27 and 24, there is situated a ring of stationary guide blades 28 secured at one end to ring 29 which is bolted to casing 10 and at their opposite ends to an annular ring 30 situated in a recess in part 25.

The axially inner end of the hollow shaft part 15 of the driving member is enlarged to provide an internal pilot bearing 31 for the journal provided by an axially extending bearing part 32 fixed to the inner end of the shaft part 21. Preferably, the impeller part 23 is keyed to the shaft part 21 and the bearing part 32 is screwed on the end of shaft part 21 as a locking member, suitable packing being provided between parts 21 and 32 to prevent leakage of operating fluid therebetween from the chamber 11.

Between the part 32 and the hollow shaft part 15, packing is provided to prevent flow of fluid which may pass bearing 31 to the space within the hollow shaft parts. This packing means comprises, in the present embodiment, a packing ring 33 fixed to the shaft part 15 and having a radially extending face against which face packing ring 34 abuts. Ring 34 is pressed against ring 33 by means of a coil spring 35 located between this part and part 32 and the space between packing ring 34 and part 32 is sealed by means of an expansible bellows member 36 attached to parts 32 and 34.

Similar packing means is provided between the journal bearing 13 and bearing 12. This packing means comprises a bearing ring 37 fixed to the shaft part 15 and having a radially extending bearing surface against which the stationary packing ring 38 is pressed by means of spring 39. Spring 39 abuts against a part attached to the stationary casing structure and ring 38 is connected to this stationary part by means of expansible bellows member 40.

Similar packing means is provided between the driven member and the bearing 22 supporting the shaft part 21. This packing means comprises a packing ring 41 fixed to shaft 21 and a co-operating packing ring 42 pressed against ring 41 by means of spring 43 located between ring 42 and a stationary part 44 attached to the casing. The space between ring 42 and part 44 is closed by means of the expansible bellows 45 attached at its ends to these two parts.

Extending through the bore provided by the hollow shaft parts 15 and 21 is shaft 46, supported at its forward end in ball bearing 47 and at its rearward end in bearing 48. Adjacent to its forward end shaft 46 has splined thereto the clutch plate 49.

Shaft 50, which may be any suitable power shaft and which in the present instance is indicated as the crank shaft of an engine or the like, has secured thereto the flywheel 51 which provides a housing for mounting bearing 47 and also provides a housing for the clutch mechanism comprising the clutch plates 19 and 49. As will be observed from the drawings, these clutch plates are located in a suitable recess in the fly-wheel and between them there is located the annular ring 52 which is axially shiftable with respect to the fly-wheel but not rotatable with respect thereto. An annular cover plate 53 suitably bolted to the fly-wheel provides a clutch surface 54 on its inner face and the fly-wheel provides a clutch surface 55 opposite the surface 54. Ring 52 is shifted axially by means of a series of peripherally spaced axially extending pins 56 which project through the cover plate 53 and at their outer ends are pivoted to levers 57. Levers 57 are in turn pivoted intermediate their ends to supports 58 secured to the cover plate 53. At their radially inner ends levers 57 engage suitable recesses in angle members 59 fixed to an annular spring plate 60 which extends radially outwardly from a ring 61 carried by ball bearing 62 and guided in a circular flange 63 on the cover plate 53. The inner race of bearing 62 is fixed to one end of a sleeve member 64 which at its other end is guided on a journal on the stationary part 65 bolted to a part in the main casing. Sleeve member 64 is provided with an external annular groove 66. Parts 61 and 64 are axially slidable with respect to parts 63 and 65 and part 61 is rotationally movable with respect to part 64 due to the interposition of bearing 62.

Casing 10 is provided with a pair of aligned transversely extending bearings 67 and 68 (see Fig. 2) in which are removably fixed pins 69 and 70. The inner ends of these pins provide bearings for a yoke 71 having arms 72 and 73 which carry on suitable pins the blocks 74 and 75 engaging the groove 66. Yoke 71 also has an arm 76 extending outwardly through a suitable opening in the housing and adapted to be connected to operating mechanism to be described.

We will now describe the means for transmitting power from the shaft part 21 or the shaft 46 to the driven shaft 77 and for effecting reversal of direction of the driven shaft 77. Shaft part 21 has fixed to its rearward end, axially outside of bearing 22, a ring part 78 having a plurality of faces thereon and forming the inner ring of an overrunning clutch indicated generally at 79. Shaft 46 at its rearward end has fixed thereto a cup-shaped part 80, the outer rim of which provides a ring 81 radially outside of ring 78 and forming the outer ring of the overrunning clutch 79. Between rings 78 and 81 are located a plurality of rollers 82 adapted to grip in the wedge-shaped spaces provided between the two rings and urged against the confronting faces of the rings by means of springs 83 carried on suitable pins 84 projecting axially from a radially extending flange adjacent to the inner clutch ring 78 and fixed with respect thereto.

Journalled on the outer face of ring 81, as by bearing 85, is the annular spider 86 carrying a plurality of peripherally spaced axially extending pins 87 which at their rearward ends are fixed in a ring 88 journalled by means of bearing 89 on an axially extending circular flange 90 at the forward end of the driven shaft 77. The inner surface of the flange 90 provides a seat for the outer race of bearing 49 supporting the rearward end of shaft 46.

Driven shaft 77 has a radially extending flange 91 at its forward end and to this is secured the cup-shaped member 92 having at its forward end a series of axially extending clutch teeth 93 and a series of radially inwardly projecting teeth 94 providing an internal gear. Journalled on each of the pins 87 is a pinion gear 95, the teeth of which mesh with teeth 94 and also with gear teeth 96 projecting from the hub portion of the part 80.

Axially slidable on a plurality of teeth or splines on the outer circumference of part 86 is the annular ring 98 having a set of axially projecting teeth 99 and at one side adapted to engage teeth 93 on part 92 and a set of teeth 100 adapted to engage a set of fixed axially extending teeth 101 formed on the stationary casing part 102. Ring 98 has an external groove 103.

The casing part 104 bolted to the main casing part 10 supports two axially aligned pins 105 and 106 the inner ends of which provide pivots for the yoke 107. Yoke 107 has arms 108 and 109 carrying blocks 110 and 111 situated in the groove 103 in the ring 98. As shown more clearly in Figs. 3 to 5 the casing part 104 has an upwardly extending arm 112 providing a bearing in which is journalled the stub shaft 113. At one end the stub shaft 113 is enlarged and slotted as at 114 and a control lever 115 is pivoted on pin 116 fixed in the enlarged portion of the stub shaft. At its opposite end stub shaft 113 has fixed thereto lever 117 which at its end is connected by means of a suitable ball and socket connection (see Fig. 6) to link 118, which at its other end by means of a second ball and socket connection is connected to the end of arm 76 on yoke 71 which projects through the casing.

The lower end of lever 115 is flattened as at 119 and extends into a slot 120 in a block 121 pivoted at the end of a lever 122 which is pivoted to the upwardly projecting end 123 of the pin 106. Pin 106 is keyed to yoke 107, so as to turn the yoke when this pin is turned in its bearing. The lower flattened end 119 of lever 115 is notched at 124 to receive the projection at the center of the slot in block 121. Lever 122 is pressed upwardly by means of a leaf spring 125.

Figure 6:
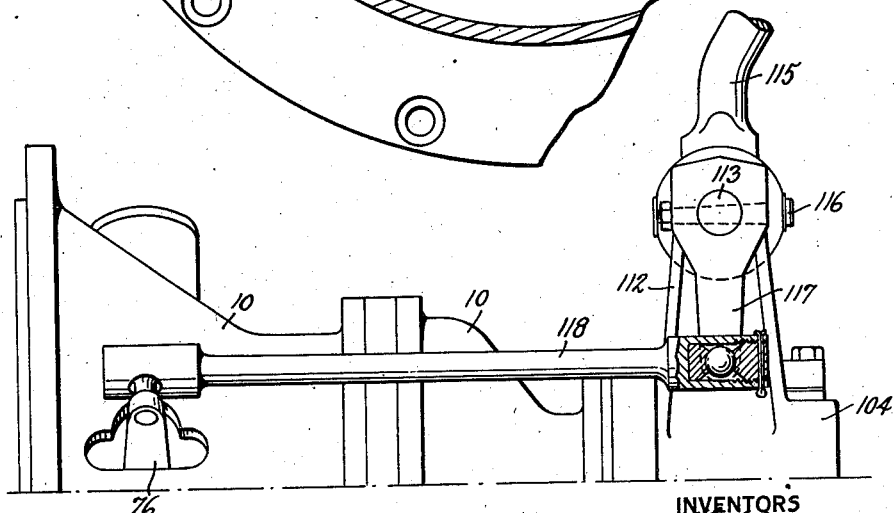
Fig. 6 is a side elevation of part of the transmission shown in Fig. 1 and including certain control parts.
Figure 8:
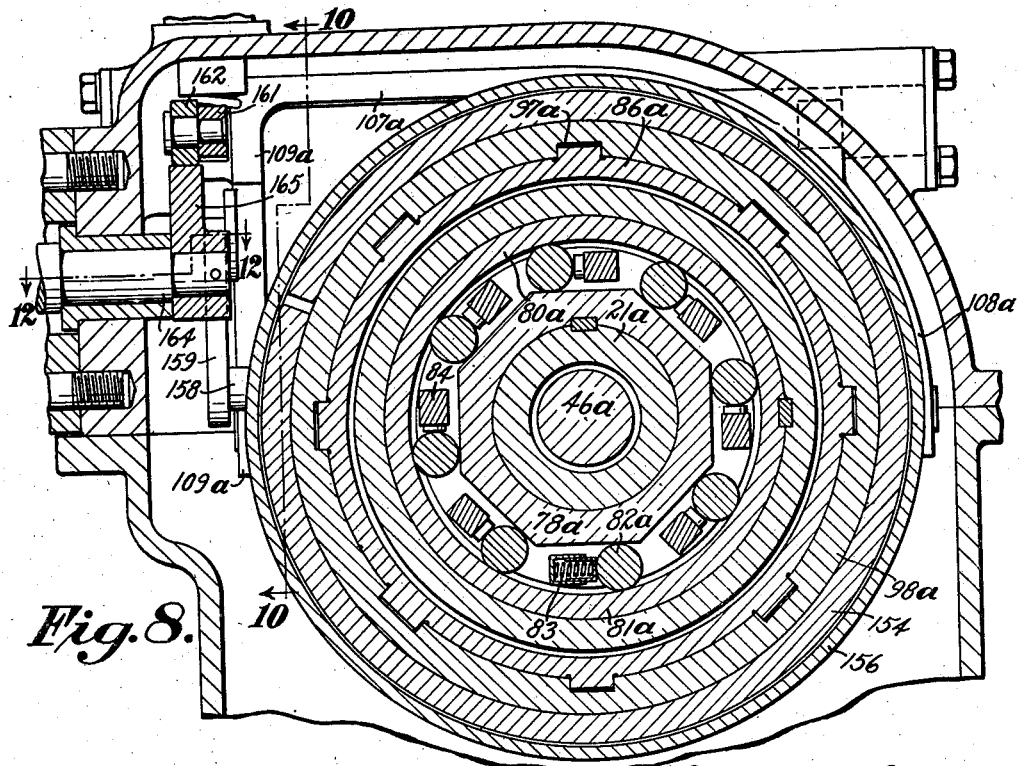
Fig. 8 is a section taken on the lines 8—8 in Figs. 7 and 10.

The operation of the apparatus in its different positions of control is as follows. It is assumed that the chamber 11 of the hydraulic mechanism is filled with operating fluid. In Figs. 4 to 6 the control lever is shown in its neutral or upright position and it will be evident that the mounting of the lever permits it to be moved both forward and backward with respect to the transmission and sidewise as well. In Fig. 1 the ring 98 is also shown in its mid or neutral position with the gear teeth 99 and 100 out of mesh with the teeth they are adapted respectively, and alternatively, to engage.

If now, the upper end of the control lever is moved to the left, as viewed in Fig. 3, and then pulled backwardly from the position shown in Fig. 6 the following action takes place. The sidewise movement of the upper end of the lever to the left as seen in Fig. 3, will move the lower end to the right, as viewed in this figure and will rotate lever 121, pin 106 and yoke 107 in clockwise direction, as viewed from above in this figure. This will result in movement of the arms 109 of yoke 107 and the blocks carried by the arms into the plane of the paper, as viewed in Fig. 3 and rearwardly of the transmission, as viewed in Fig. 1, thus causing meshing of teeth 93 and 99.

The backward pull of the upper end of the control lever, that is, to the right as viewed in Fig. 6, will cause movement of yoke 71 (Fig. 2) through the medium of the link 118 so as to shift the part 64 (Fig. 1) rearwardly to the position shown in Fig. 1. This will result in moving ring part 52 forwardly to the position shown. Ring part 52 exerts engaging pressure against clutch plate 49 because of the spring action of the spring plate 60, which it will be noted is dished and in tending to straighten itself exerts pressure on the levers 57 in a manner causing them to force the pins 56 forwardly. With the clutch mechanism in this position it will be evident that power will be transmitted from the driving shaft 50 through clutch plate 49 to the central shaft 46 and to the member 80. Assuming the usual direction of rotation of shaft 50, that is, clockwise, as viewed from the left in Fig. 1, ring 81 forming the outer ring on the overrunning clutch 79 will rotate in clockwise direction, as viewed in Fig. 3 and from this figure it will be evident that the clutch will not transmit power to the inner ring 78. Consequently, the shaft part 21 and the impelled part of the secondary member of the hydraulic mechanism will remain stationary. Also, from Fig. 1 it will be evident that power will not be transmitted to the primary member of the hydraulic mechanism since the clutch plate 19 is free. This prevents loss of power due to rotation of any part of the hydraulic mechanism when power is transmitted through shaft 46.

Meshing of the teeth 93 and 99, due to the above assumed sidewise movement of the control lever locks the part 86, and consequently the pins upon which the planetary pinions 95 are mounted, against rotational movement with respect to part 92, fixed to the driven shaft 77. With the pins upon which the pinions 95 are mounted locked against rotation relative to part 92 and with the teeth of these pinions meshing with teeth 94 on part 92, it will be evident that the pinions cannot revolve about their own individual axes, and they will consequently act as force transmitting parts for transmitting power from the part 80 fixed to shaft 46 to the part 92 fixed to the driven shaft 77. Direct drive is thus established through the transmission from shaft 50 to the driven shaft 77 by movement of the control lever, as assumed, to the left and rearwardly of the transmission.

If, with the upper end of the control lever still to the left of neutral position, the lever is moved forwardly past the neutral position (to the left as viewed in Fig. 6), it will be evident that the teeth 93 and 99 will remain in mesh and that the relation of the parts through which drive is effected from part 80 to part 92 will remain unaltered. On the other hand this movement will shift part 64 forwardly, or to the left as seen in Fig. 1, and this will result in a shifting of the levers 57 to pull the clutch ring 52 to the right in the figure so as to release the clutch plate 55 and cause engagement between the fly-wheel parts and the clutch plate 19. From Fig. 1 it will be evident that due to the movement of levers 57 around their radially fixed pivots, the spring plate 60 will be dished by an increasing amount until the levers 57 have passed dead center position and will then be dished by a decreasing amount as the inner ends of the levers move forwardly from dead center position. This arrangement provides a toggle action such that the spring plate 60 will operate to exert pressure on clutch plate 19 when this clutch is engaged, in the same manner that it exerts engaging pressure on clutch plate 49 in the position shown of the parts shown in Fig. 1.

When power is transmitted through clutch plate 19, the primary member of the hydraulic mechanism is rotated in clockwise direction as viewed from the left of Fig. 1 and the impeller blades 17 circulate the operating fluid in chamber 11 radially outwardly through these blades, then through the first row of turbine blades 27, the row of fixed guide blades 26 and the second row of turbine blades 24. Circulation of the operating fluid in the closed path of flow provided in chamber 11 transmits power to the driven member of the hydraulic mechanism in the manner more fully described in Pat. No. 1,900,118 granted March 7, 1933 on the application of Alf Lysholm, to which reference may be had for a more complete description of the operation of hydraulic variable-speed power transmitting mechanism of the general type herein shown.

Rotation of the secondary member of the hydraulic mechanism also in clockwise direction results in clockwise movement of the inner ring 78 of the overrunning clutch, as viewed in Fig. 3.

This causes the rollers 82 to grip and transmit power by way of the ring 81 to the part 80, from which motion is transmitted, without relative motion between the parts, to the driven shaft 77. This position of the control lever provides forward variable speed drive through the hydraulic mechanism.

To reverse the direction of drive of shaft 77, the control lever is moved sidewise to the right as viewed in Fig. 3 and forwardly as viewed in Fig. 6. The forward movement of the lever will effect adjustment of the clutch parts so as to cause power to be transmitted through the hydraulic mechanism to the part 80 in the manner just described. The sidewise movement of the lever to the right (as viewed in Fig. 3) will, however, operate to shift ring 98 to the left in Fig. 1 and cause teeth 100 to mesh with the stationary teeth 101. This locks part 86 against rotation and consequently fixes against rotation the pins upon which the pinion gears 95 are mounted. Also, due to the unmeshing of teeth 93 and 99, part 92 is free to revolve with respect to the part 86. With the parts in this relation, rotation of part 80 in clockwise direction causes rotation of part 92 in counter-clockwise direction, through the medium of the pinions 95, which revolve around their individual fixed axes.

From the foregoing description it will be evident that the control arrangement provided is similar to conventional gear shift controls and means of any suitable nature may be employed to guide the control lever to its various operative positions. The spring pressed block 121 shown in Fig. 4 serves to tend to hold the lever in neutral position, and forward and backward movement of the lever may be prevented by suitable blocks, one of which is shown at 126 in Fig. 4, except when the lever is shifted sidewise to engage either teeth 99 or 100. It will be evident that direct drive in reverse is ordinarily not desirable and any suitable stop means may be employed to prevent movement of the lever sidewise to the right as viewed in Fig. 3 and backward, which movement would cause engagement of the direct driving clutch plate 49 and engagement of teeth 100 with teeth 101 to transmit drive in reverse direction to shaft 77.

Turning now more particularly to the details of construction shown in Fig. 1, it will be observed that by mounting the forward end of the driven member of the hydraulic mechanism in a pilot bearing in the driving member, the main rotating parts of the hydraulic mechanism may be rigidly mounted within a comparatively short axial space, which in the present embodiment is represented by the distance between bearings 12 and 22. The driving member is held in alignment between the spaced bearings 12 and 13 and the driven member is held in alignment between the bearings 22 and 31. If it were not for mounting the forward end of the driven member in the pilot bearing a second bearing rearwardly of bearing 22 would be required to hold this part in alignment and this would involve additional axial length of the transmission. It will be appreciated that for automotive and like installations the saving in space is of material practical importance. It is evident that the efficiency of operation of the hydraulic mechanism will be greatly impaired by large clearances between the rotating members and the stationary casing parts and also by large clearances between the adjacent parts of the relatively rotating driving and driven members. By mounting one of the members in a pilot bearing in the other, it is evident that not only a relatively rigid mounting is obtained for the members with respect to the casing but relative movement of one member radially with respect to the other due to worn bearings is also minimized. This construction enables close initial clearance to be employed and materially assists in maintaining the initial close clearances over long continued periods of use.

By making the driving and driven members with coaxial hollow shaft parts a simple and convenient direct drive arrangement is made possible and by means of the pilot bearing and packing arrangement shown any substantial amount of leakage of operating fluid from the chamber 11 through the hollow shaft parts is prevented. It will further be noted that the arrangement shown provides for separation of the ball bearings from contact with operating fluid so that these bearings may be adequately lubricated with suitable lubricating oil. The pilot bearing is preferably, as shown, a plain journal bearing and adequate lubrication of this bearing may be obtained from the operating fluid which is usually of some relatively oily character. For example, we have found a most satisfactory operating fluid to be kerosene containing a small quantity, such for example as about five percent, of lubricating oil. Journal bearing 13, however, may be lubricated from an external lubricator through the channel 127.

Such operating fluid as may leak past the several packings to the interior of the hollow shafts 15 and 21 is preferably kept from flowing longitudinally by means of suitable internal recesses in these parts and ridges on the shaft 46, the recesses being connected through drain channels for conducting the fluid from the transmission. These drain channels need not be described in detail.

The advantage of the reverse gear arrangement is more or less self-evident since this arrangement provides a gear of an axially compact nature which, taken in conjunction with the manner of mounting the main rotating members of the hydraulic mechanism, enables the entire transmission to be made with a minimum longitudinal over all length. At the same time the reverse gearing shown requires comparatively little space transversely.

Turning now to the form of transmission shown in Figs. 7 to 12, the clutch arrangement at the forward end of the transmission is similar to that previously described and is controlled by means of a suitable yoke having an arm extending through the transmission casing similar to the arm 76 shown in Fig. 6. In the present embodiment the driving member of the hydraulic mechanism comprises a hollow member 15a and a disc-like impeller part 16a carrying a ring of impeller or pump blades 17a. The driven member comprises a hollow shaft part 21a and a turbine part 23a, the latter carrying three rows of turbine blades 27a, 24a, and 128. The inner ends of the pump blades 17a are carried by ring 18a and the inner ends of turbine blades 128 carry ring member 25a to which the blades 27a and 24a are attached. The outer ends of blades 27a are attached to a ring 129 and the outer ends of blades 24a are carried on ring 130. Rings of stationary guide blades 28a and 131 are carried by the casing, the inner ends of blades 131 being connected by a ring 30a situated in a suitable recess in the part 25a. It will be evident that as the operating fluid is circulated in the closed path of flow in the chamber 11a, it will tend to leak out from its confined path through the clearance spaces between the relatively moving ring parts and between some of these ring parts and the walls of the casing 10a which together with these parts define the path of flow. Such leakage is detrimental to the efficiency of operation of the transmission mechanism and in order to minimize this leakage we provide between the several relatively rotating parts cooperating projections and recesses which form in effect labyrinth packings providing substantial resistance to leakage flow. This construction is shown more clearly in Fig. 11 with respect to the part 29a fixed to the transmission which carries the row of stationary guide blades 131, and the rotating parts 23a and 130. Part 29a is flanged at 132 and 133 and these flanges are recessed at 134 and 135 respectively. Parts 23a and 130 are similarly flanged and the flanged portions are provided with recesses 136 and 137 which cooperate respectively with recesses 134 and 135 to provide what may be termed labyrinth packings comprising series of spaced narrow clearance spaces 138 and 139. The narrow clearance spaces separated by the recesses provide a tortuous path of flow for operating fluid the nature of which tends to create turbulence in the flow of fluid tending to leak, and consequently minimizes leakage.

Similar labyrinth packing is provided between other of the relatively rotating parts, as for example, as indicated generally at 140 in Fig. 11.

It will further be evident that the operating fluid circulating in the closed path of flow will exert axial pressure on the parts 16a and 23a, tending to force them axially apart. This thrust is balanced to a substantial degree by the pressure of fluid in the spaces 141 and 142 provided between stationary casing parts and the parts 16a and 23a respectively. Fluid under pressure enters space 141 by way of the clearance space between ring 129 and the casing 10a and fluid enters space 142 by way of the clearance space between the ring 130 and the casing 10a. In order to prevent the relatively high pressure prevailing in spaces 141 and 142 from reaching the radially inner portion of the apparatus, labyrinth packings 143 and 144 are provided between parts 16a and 23a, respectively, and adjacent parts of the stationary casing structure. These packings comprise cooperating projections and recesses similar to those described above with reference to Fig. 11.

It will be noted that there is a relatively large space 145 between the main casing and the radially inner part of the part 23a and in order to minimize loses due to turbulence of fluid in this space a stationary baffle plate 146 is provided adjacent to the radially inner portion of part 23a. This baffle serves to maintain the fluid in the space 145 in substantial quiescent state even when the turbine member is rotating.

The pilot bearing arrangement in the present modification is different from that shown in Fig. 1, the driven member in this instance being rotatably supported in the casing by the ball bearing 22a and the journal bearing 13a, the latter being formed in the stationary casing part 147. The turbine part 23a provides a cylindrical journal 148 for the pilot bearing 149 formed in the annular extension 150 on the impeller part 16a of the driving member. The driving member is supported by pilot bearing 149 and ball bearing 12a.

It will be evident that this arrangement provides the same compactness and insures the same alignment of parts as the arrangement previously described in connection with Fig. 1.

As in the arrangement shown in Fig. 1, packings are provided between the casing and the driving and driven members of the hydraulic mechanism and packing is provided between these members. The construction and arrangement of the packings is substantially the same as that previously described and need not be again described in detail.

Means for transmitting power from the central shaft 46a or from the hollow shaft part 21a of the hydraulic mechanism to the driven shaft 77 is different from that shown in Fig. 1 and comprises friction clutch apparatus the nature of which facilitates manipulation of the means for controlling the transmission.

In the present embodiment the rearward end of the central shaft 46a is splined in a recess 151 at the forward end of the driven shaft part 77a so that this central shaft forms in effect a continuation of the driven shaft extending through the transmission to the clutch plate.

The rearward end of the hollow shaft 21a has fixed to it the inner ring 78a of the overrunning clutch, the outer ring 81a of which is fixed inside the forward end of the annular member 80a which is rotatably supported in ball bearings 152 and 153. Adjacent to its rearward end the part 80a has fixed thereto a ring carrying external gear teeth 96a. The forward end of the driven shaft part 77a has a radially extending flange part 91a and an axially extending annular flange 90a providing a bearing 89a for supporting a ring 88a in which the rearward ends of pins 87a are mounted. The forward ends of pins 87a are mounted in a ring-like part 86a supported by bearing 85a on the part 80a. Part 86a is provided with external axially extending teeth or splines 97a engaged by internal cooperating teeth on an axially shiftable sleeve 98a which at its rearward end is provided with axially extending teeth 99a adapted to engage teeth 93a fixed with respect to the part 91a. Part 91a has secured thereto the axially extending part 92a having internal gear teeth 94a. The pins 87a carry pinions 95a, the teeth of which mesh with teeth 94a and teeth 96a.

A heavy coil spring 154 is disposed around the sleeve 98a the forward end of the spring being fastened to the stationary part 155 fixed to the casing. Spring 154 is surrounded by a stationary sleeve 156, there being sufficient space between parts 98a and 156 to permit the spring to uncoil and expand so as to be out of contact with part 98a.

Figures 9, 10:
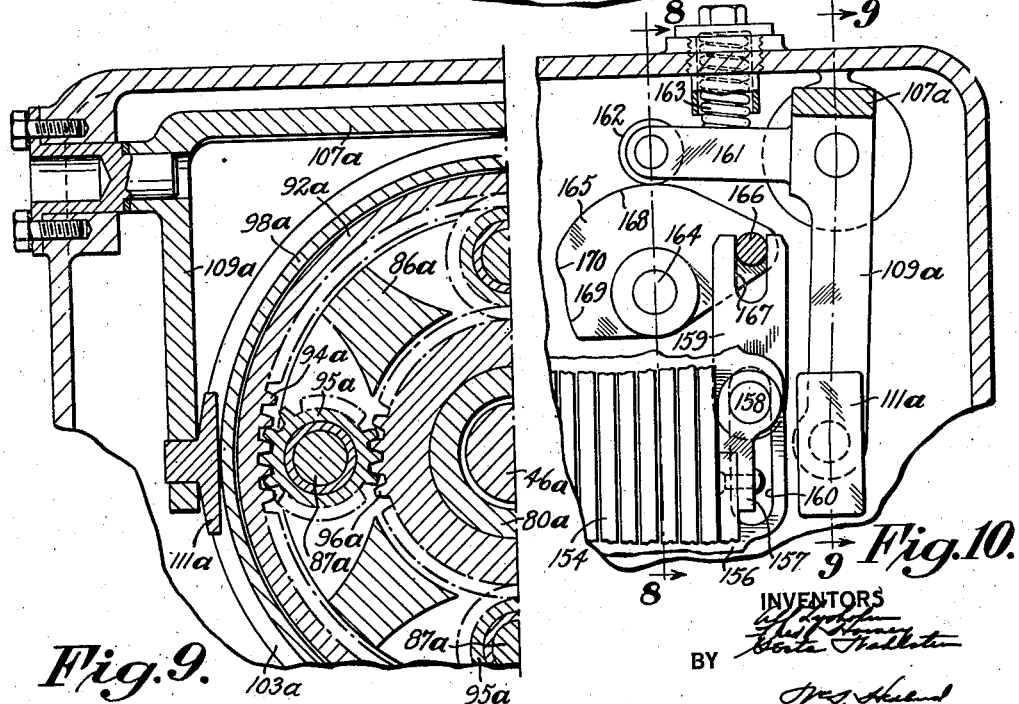
Fig. 9 is a section taken on the lines 9—9 in Figs. 7 and 10.
Fig. 10 is a section taken on the line 10—10 of Fig. 8.

As shown in Fig. 10, the rearward end of spring 154 has fixed thereto a lug 157 to which is pivotally connected by means of pin 158 a link 159. Sleeve 156 is extended and provided with a slot 160 serving as a guide for pin 158.

Yoke 107a is pivoted in the casing and is provided with arms, one of which is shown at 108a in the figure. This arm carries at its lower end the block 111a fitting in the groove 103a in the sleeve 98a. The other arm of the yoke carries a similar block situated in groove 103a. Yoke 107a has an arm 161 extending substantially at right angles to the arm 108a and having at its outer end a roller 162. A spring 163 carried in a suitable retainer in the housing bears against arm 161 as indicated in Fig. 10.

A shaft 164 rotatably mounted in the side of the casing and extending therethrough has fixed at its inner end a cam plate 165 against which the roller 162 bears. Plate 165 carries a projecting pin 166 and this pin is located in an open ended slot 167 at the end of link 159.

It is to be noted that cam plate 165 is provided with circular cam surfaces 168 and 169 of different radius, these surfaces being connected by an intermediate eccentric cam surface 170.

The end of shaft 164 projecting from the casing is provided with a beveled pinion 171 (see Fig. 12) meshing with the beveled sector 172 rotatably mounted in the housing 173 bolted to the main transmission casing. A control shaft 174 is provided with a splined portion passing through a suitable splined bore in the sector part 172. Shaft 174 is slidable axially with respect to part 172 but by means of the splines is rotationally fixed with respect thereto.

The operation of this mechanism in the different control positions is as follows. When the control lever, which may be similar to that described in connection with Fig. 1 and related figures, is moved so as to cause the central shaft 46a to be directly connected to the power shaft, direct mechanical drive is effected to the driven shaft 77a through the splined connection in the recess 151. Assuming that the axially shiftable sleeve 98a is in a position to the right of that shown in Fig. 7 with teeth 93a and 99a in mesh, the parts 92a, 98a, 95a, 86a, and 80a will revolve as a unit without relative motion between the parts due to the connection between these parts and the driven shaft part 77a through the flange 91a. Rotation of part 80a and the outer ring 81a of the overrunning clutch, without rotation of the driven member of the hydraulic mechanism, is permitted because of the action of the overrunning clutch 79 between parts 21a and 80a.

In order to insure freedom of rotation for the part 98a under the assumed direct drive conditions, the shaft 164 must be rotated in clockwise direction from the position shown in Fig. 10 to a position such that roller 162 is moved from the cam surface 168 to the cam surface 169. This movement will cause pin 166 to first move to the bottom of the slot 167 and then to move link 159 downwardly as viewed in Fig. 10. This movement will evidently uncoil spring 154 so that it will not be in contact with sleeve 98a and the latter will be free to rotate insofar as spring 154 is concerned.

When the cam plate 165 is moved in clockwise direction to bring roller 162 into contact with the cam surface 169 spring 163 will cause roller 162 to follow the cam surface and will cause the yoke 107a to move in counter-clockwise direction as viewed in Fig. 10. This will move block 111a and its companion block rearwardly of the transmission to shift sleeve 98a into the position already assumed, that is, with teeth 93a and 99a in mesh.

When the transmission clutches are shifted to provide forward drive through the hydraulic mechanism, the transmission of power from the hydraulic mechanism to the driven shaft member 77a is as follows. The hollow shaft part 21a is rotated in clockwise direction as viewed from the left in Fig. 1 and as viewed in Fig. 8, thus causing the overrunning clutch to turn part 80a, the teeth 96a of which are in mesh with the teeth of pinions 95a. Due to the fact that the part 86a carrying the pins 87a upon which the pinions are mounted is held against rotation with respect to the part 91a by virtue of the connection through the part 98a and the meshing teeth 93a and 99a, and that the teeth of the pinions 95a are in mesh with teeth 94a on the part 92a which is also fixed against rotation with respect to part 91a, the pinions are prevented from rotating about their own individual axes and act as direct drive connections for transmitting power from the part 80a to the part 91a and consequently to the driven shaft part 77a. Thus, direct drive is established between the driven member of the hydraulic mechanism and the driven shaft of the transmission, speed reduction between the power shaft and the driven shaft of the transmission being effected in the hydraulic mechanism. In order to effect drive in reverse direction of the driven shaft part 77a, the shaft 164 is rotated to the position shown in Fig. 10. When roller 162 is forced up on to the cam surface 168 it moves the yoke 107a to the position shown in this figure which corresponds to the position of the parts shown in Fig. 7, thus causing sleeve 98a to be shifted to the position shown in Fig. 7, with teeth 93a and 99a out of mesh. At the same time the expanding pressure exerted by link 159 on spring 154 is relieved and the spring contracts and wraps itself around sleeve 98a. The spring is coiled so that tendency of sleeve 98a to rotate under the influence of force transmitted thereto tends to make the spring wrap itself more tightly about the sleeve. The wrapping of spring 154 around sleeve 198 locks this sleeve against rotation, due to the anchoring of the spring to the transmission casing. Under these conditions when force is transmitted through the overrunning clutch to the part 80a, this part rotates in clockwise direction and causes the pinions 95a to rotate about their own axes, which are held stationary due to the connection between part 86a and sleeve 98a. Pinions 95a transmit motion in reverse direction from part 80a to the part 92a, causing the latter, and consequently the driven shaft part 77a, to rotate in counter-clockwise or reverse direction, as viewed from the left of Fig. 7.

When the parts are set for reverse drive, as shown in Fig. 10, it will be observed that some lost motion or clearance is provided between pin 166 in the bottom of slot 167. This insures freedom of spring 154 to wrap itself tightly about the sleeve 98a so as to lock the sleeve firmly against rotation.

The projecting end of the yoke lever 76 for controlling the clutches and the shaft 174 (Fig. 12) for turning shaft 164 to control the direction of drive may be combined so as to be operated from a single control lever of the type shown in Fig. 6 in any suitable manner.

One suitable form of apparatus for connecting these parts to a single control lever is disclosed in Pat. No. 1,900,119, previously referred to, and to which reference may be had for suitable details of construction.

It will be evident that the general mode of operation of the transmission just described is the same as that described in connection with Fig. 1 and related figures. The present embodiment, however, provides important advantages in the control of the transmission by virtue of the inclusion of the friction clutch provided by spring 154 for locking the sleeve 98a in order to obtain reversal of the direction of drive to the driven shaft. Because of the elastic connection in the hydraulic mechanism between the driving and driven members, it will be evident that it is possible for the driving and driven members not only to rotate in the same direction at different speeds but to rotate in opposite directions and for this reason it is possible, without damage to the transmission, to have the transmission set for reverse drive when the vehicle in which the transmission is mounted is moving forwardly and with the engine delivering power to the driving member in operation. Due to the employment of friction clutch means for locking sleeve 98a so as to effect reverse, it is possible to shift the control of the transmission to reverse position with the vehicle moving forwardly without damaging any of the transmission parts and when this is done it will be evident that the hydraulic mechanism will provide an extremely powerful braking agency due to its tendency to transmit motion in reverse direction to the driven shaft of the vehicle. The transmission thus makes available to the operator of the vehicle what may be said to be a motor or engine actuated hydraulic brake operating through the usual drive line of the vehicle to apply braking action to the driven wheels of the vehicle.

Turning now more particularly to Fig. 13, another arrangement is shown for mounting the driving and driven members of the hydraulic mechanism. In this arrangement plain journal bearings are used throughout. The driving member 14b comprises the hollow shaft part 15b and impeller part 16b and is mounted in a plain bearing in the casing 10b, indicated generally at 175. This bearing comprises a cylindrical bearing surface 175a and a radially extending bearing surface 175b so that the bearing provides not only radial support for the driving member but also provides a surface for preventing axial displacement of the driving member.

The driven member 20b is mounted in the casing by bearing 176 having a cylindrical portion 176a and a radially extending bearing surface 176b. The shaft part 21b of the driven member is provided with a forwardly projecting annular extension 177 projecting into a suitable recess in the extension 178 of the driving member 14b. Extension 177 is journalled in the driving member by means of a pilot bearing which in the present instance comprises the spaced cylindrical bearing surfaces 179 and 180 and a radially extending bearing 181 provided between the driven member 20b and the radially extending extension 178 on the driving member 14b. From the drawings it will be evident that the above described bearing arrangement provides for holding the driving and driven members of the hydraulic mechanism in proper coaxial alignment with respect to each other and with respect to the casing and also provides against axial end play of the members both with respect to each other and with respect to the casing.

In this arrangement, as in the arrangements previously described, packing is provided between the driving and driven members for preventing flow of fluid to the space in which the central shaft 46 is located. This packing it will be observed is in all the several embodiments arranged with respect to the pilot bearing so that any fluid passing from the working chamber of the transmission to the space in which the direct drive shaft is situated must force its way serially past bearing surfaces of considerable area and also past the packing, which may be said to be arranged in series with respect to the bearing surfaces with respect to leakage flow.

This minimizes possibility of leakage of operating fluid from the main operating chamber at this point and also minimizes the possibility of air passing to the operating chamber from the space around the central drive shaft under conditions of operation which might produce negative pressure of the operating fluid in the radially inner portion of the operating chamber.

In the present embodiment packings of the type already described are provided between the hollow shaft parts 15b and 21b and the casing to prevent leakage of operating fluid around the outside of these shaft parts.

In all of the hydraulic mechanisms hereinbefore described, it is desirable to maintain the operating fluid under some degree of positive pressure so as to prevent ingress of air to the operating chamber and it is also desirable to continuously withdraw a certain amount of operating fluid from the operating chamber to cool it, the operating fluid lost from the chamber due to leakage and withdrawal for cooling purposes being continuously replaced by make-up fluid supplied to the chamber. For effecting this we prefer to employ apparatus constructed in accordance with the disclosure in U. S. Pat. No. 1,934,936 granted March 7, 1933 on the application of Alf Lysholm, to which reference may be had for details not shown in this application.

In considering the several embodiments hereinbefore described, it will be noted that the blading arrangement in the hydraulic power transmitting mechanism in the embodiment shown in Fig. 1 is somewhat different from that illustrated in Fig. 7. The form shown in Fig. 1 employs two rows of turbine blading, while that illustrated in Fig. 7 employs three rows of turbine blading. Somewhat lower maximum efficiency may be expected from the form having two rows of turbine blades, but the form having two rows of turbine blades may be made smaller in diameter and lighter and is consequently better adapted for installation in automobiles and the like of the pleasure type as distinguished from heavier vehicles such as buses and trucks. The pleasure vehicle type is normally operated for only a small percentage of the total time of operation with a speed-reducing gear ratio, operation during the major portion of the time being in direct drive. Consequently, somewhat lower efficiency in the hydraulic mechanism than that which it is possible to obtain is satisfactory in view of the advantages obtained with respect to weight and space occupied.

With all of the forms of transmission illustrated it will be observed, however, that the utmost compactness is obtained because of the form of construction of the clutch mechanism for the alternatively engageable clutches, the hydraulic variable-speed power transmitting mechanism, and the gearing for obtaining drive in reverse direction.

It will be evident that the invention may be embodied in many different forms of apparatus and that some of the features of the invention may be employed to the exclusion of others.

Certain features of the invention dealing with the hydraulic parts of the apparatus form the claimed subject matter of our divisional application Serial No. 754,080, filed November 21, 1934.

What is claimed is:

1. A variable-speed power transmission comprising a driving shaft, a driven shaft, a first means comprising a releasable clutch for transmitting power mechanically from the driving shaft to the driven shaft, a second means for transmitting power from the driving shaft to the driven shaft, said second means comprising hydraulic variable speed power transmitting mechanism having a driven member, a second releasable clutch for transmitting power from the driving shaft to said hydraulic variable speed mechanism, mechanism for transmitting power from the driven member of the hydraulic mechanism to said driven shaft comprising planetary gearing and mechanism including frictionally engaging parts for controlling said planetary gearing to cause power to be transmitted directly through the gearing in one position of the control means and to cause power to be transmitted to the driven shaft in reverse direction through the gearing in another position of the controlling means.

2. A variable-speed power transmission comprising a driving shaft, a driven shaft, a first means comprising a releasable clutch for transmitting power mechanically from the driving shaft to the driven shaft, a second means for transmitting power from the driving shaft to the driven shaft, said second means comprising hydraulic variable-speed power transmitting mechanism having a driven member, a second releasable clutch for transmitting power from the driving shaft to said hydraulic variable speed mechanism, mechanism for transmitting power from the driven member of the hydraulic mechanism to said driven shaft comprising planetary gearing and an overrunning clutch arranged in series in the path through which power is transmitted and mechanism including frictionally engaging parts for controlling said planetary gearing to cause power to be transmitted directly through the gearing in one position of the control means and to cause power to be transmitted to the driven shaft in reverse direction through the gearing in another position of the controlling means, said overrunning clutch providing a release permitting the driven member of the hydraulic mechanism to remain stationary when power is transmitted to the driven shaft through said first means.

3. A variable-speed power transmission comprising a driving shaft, a driven shaft, a first means comprising a releasable clutch for transmitting power mechanically from the driving shaft to the driven shaft, a second means for transmitting power from the driving shaft to the driven shaft, said second means comprising hydraulic variable-speed power transmitting mechanism having a driven member, a second releasable clutch for transmitting power from the driving shaft to said hydraulic variable speed mechanism, mechanism for transmitting power from the driven member of the hydraulic mechanism to said driven shaft comprising planetary gearing and means for controlling said planetary gearing to cause power to be transmitted directly through the gearing in one position of the control means and to cause power to be transmitted to the driven shaft in reverse direction through the gearing in another position of the controlling means, said planetary gearing comprising a rotatably mounted carrier for the planetary gears arranged to cause reversal of the direction of drive to the driven shaft when the carrier is prevented from rotating and said controlling means comprising a releasable friction clutch adapted to prevent rotation of said carrier.

4. A variable-speed power transmission comprising a casing, a pair of alternatively engageable friction clutches at the forward end of said casing, hydraulic variable-speed power transmitting mechanism comprising a driving member connected to one of said clutches and a driven member rotatably mounted in said casing, the driving member comprising a hollow shaft part and an impeller part and the driven member comprising a hollow shaft part and an impelled part, said impeller and impelled parts being located in a common chamber for operating fluid in said casing and being arranged to transmit power from the impeller part to the impelled part and said hollow shaft parts being arranged in axial alignment centrally of the casing, a shaft connected to the other of said clutches and extending through said hollow shaft parts, a driven shaft and means for transmitting power either from said driven member or the first mentioned shaft to the driven shaft comprising planetary gear mechanism and an overrunning clutch arranged in series in the line of power transmission between said driven member and said driven shaft, said overrunning clutch permitting said driven member to remain idle when power is transmitted to the driven shaft through the first mentioned shaft and said planetary gearing providing for drive in either direction of the driven shaft from the driven member of the hydraulic mechanism, mechanism including frictionally engaging parts for controlling said planetary gearing, and means for delivering power to one or the other of said alternatively engageable friction clutches.

5. Variable speed power transmitting mechanism for vehicles comprising a driving shaft, a driven shaft mechanically connected to the wheels of the vehicle, a driving member comprising a pump part adapted to be driven by said driving shaft, a driven member comprising a turbine part adapted to be driven in one direction only by fluid circulated by said pump part, means for directly connecting said driving shaft and said driven shaft, means for selectively causing power to be transmitted from said driving shaft to said driving member or directly to the driven shaft, means including a free wheel clutch and a planetary reverse gear for transmitting power from said driven member to said driven shaft, said reverse gear being located between the free wheel clutch and the driven shaft in the line of power transmission, and means including frictionally engaging parts for controlling said planetary reverse gear whereby to permit the reverse gear to be engaged to provide reverse rotation of the turbine part with respect to said driven shaft when the driven shaft is turning in the direction corresponding to forward motion of the vehicle.

6. A variable speed power transmission comprising a stationary casing providing a chamber for operating fluid, a rotatably mounted driving member comprising a pump part located in said chamber and a shaft part, a rotatably mounted driven member comprising a turbine part located in said chamber and a shaft part, said turbine part having a plurality of stages of blading and said pump part and said turbine part being arranged for circulation of operating fluid in a closed path of flow to effect torque multiplying transmission of power from the shaft part of the driving member to the shaft part of the driven member, reverse gear mechanism for transmitting power from the shaft part of said driven member to a driven shaft and mechanism including frictionally engaging parts for controlling said reverse gear mechanism whereby to permit the reverse gear mechanism to be engaged to effect reverse rotation of said driven member and said driven shaft with respect to each other while said driven shaft is in motion.

7. In a variable speed power transmission, a stationary casing providing a chamber for operating fluid, a driving member comprising a pump wheel located in said chamber, a driven member comprising a turbine wheel located in said chamber and having a plurality of stages of blading, said turbine wheel being adapted to be driven in one direction only by operating fluid circulated in said chamber by said pump wheel and said driving member and said driven member cooperating to multiply the torque delivered by the driving member, planetary gear mechanism for transmitting power from said driven member selectively in either direction of rotation to a driven shaft and mechanism including frictionally engaging parts for controlling said planetary gear mechanism to permit the planetary gear mechanism to be engaged to effect reverse rotation of said driven member and said driven shaft with respect to each other when the driven shaft is in motion whereby to provide a fluid brake transmitting to said driven shaft a braking torque derived from said driving member and of higher value than the torque available at the driving member.

8. A variable-speed power transmission for transmitting power from a driving shaft to a driven shaft comprising hydraulic variable-speed power transmitting mechanism having a driving member and a driven member, said members being rotatably mounted and having hollow shaft parts in coaxial alignment, an intermediate shaft extending through said hollow shaft parts and adapted to transmit power mechanically from the driving shaft to the driven shaft, alternatively engageable friction clutches for transmitting power from the driving shaft to said driving member or to said intermediate shaft, means for transmitting power from said driven member to said driven shaft and means for engaging one or the other of said friction clutches comprising toggle mechanism and a disc-like spring plate for applying engaging force to one or the other of said clutches.

9. A variable-speed power transmission including hydraulic power transmitting mechanism having fluid circulating means and a turbine member adapted to be driven in one direction only by the circulation of said fluid, planetary reverse gearing arranged in series in the line of power transmission from said turbine member to a driven shaft and means including frictionally engaging parts for permitting power transmitting connection through said gearing to be shifted to connect said turbine member to said turbine shaft for reverse drive of said driven shaft without shock due to rotation of said turbine member in forward direction under the influence of the fluid circulating in said hydraulic mechanism.

10. A variable-speed power transmission comprising a driving shaft, a driven shaft, a first means comprising a releasable clutch for transmitting power mechanically from the driving shaft to the driven shaft, a second means for transmitting power from the driving shaft to the driven shaft, said second means comprising hydraulic variable-speed power transmitting mechanism having a driven member, means for transmitting power from the driving shaft to said hydraulic variable-speed mechanism, mechanism for transmitting power from the driven member of the hydraulic mechanism to said driven shaft comprising planetary gearing and means for controlling said planetary gearing to cause power to be transmitted directly through the gearing in one position of the control means and to cause power to be transmitted to the driven shaft in reverse direction through the gearing in another position of the control means, said planetary gearing comprising a rotatably mounted carrier for the planet gears arranged to cause reversal of the direction of drive to the driven shaft when the carrier is prevented from rotating, and said controlling means including a releasable clutch adapted to prevent rotation of said carrier.

11. In a variable-speed power transmission for transmitting power from a driving shaft to a driven shaft, a casing providing a chamber for operating fluid, a driven member having a turbine part in said chamber and a hollow shaft part, means in said chamber for circulating the fluid therein to rotate said driven member, a rotatably mounted central shaft member extending through the hollow shaft part of said driven member, planetary gearing including a sun gear, a ring gear, planet gears and a carrier for the planet gears, said sun gear being directly connected to said central shaft part, clutch means for selectively establishing driving connection between said driving shaft and said central shaft part, clutch means for transmitting power from said hollow shaft part to said sun gear and a power transmitting connection between said planetary gearing and said driven shaft.

12. In a variable-speed power transmission for transmitting power from a driving shaft to a driven shaft, a casing providing a chamber for operating fluid, a driven member having a turbine part in said chamber and a hollow shaft part, means in said chamber for circulating the fluid therein to rotate said driven member, a rotatably mounted central shaft member extending through the hollow shaft part of said driven member, planetary gearing including a sun gear, a ring gear, planet gears and a carrier for the planet gears, said sun gear being directly connected to said central shaft part, clutch means for selectively establishing driving connection between said driving shaft and said central shaft part, clutch means for transmitting power from said hollow shaft part to said sun gear and clutch means for selectively connecting either said carrier or said ring gear to said driven shaft.

ALF LYSHOLM.
FRED HORNEY.
GÖSTA WAHLSTEN.